United States Patent [19]
Cooley et al.

[11] Patent Number: 5,331,357
[45] Date of Patent: Jul. 19, 1994

[54] ILLUMINATION ASSEMBLY

[75] Inventors: Denton A. Cooley, Houston, Tex.; Bernard Clark, Arlington, Vt.; Frederick Morris, Shrewsbury, Mass.; Lawrence E. Delaney, Bristol, Pa.; Peter Vari, Newtown, Pa.; William L. Chesterson, Richboro, Pa.

[73] Assignee: Luxtec Corporation, Worcester, Mass.

[21] Appl. No.: 922,914

[22] Filed: Jul. 31, 1992

[51] Int. Cl.$^5$ .............................. G02C 1/00
[52] U.S. Cl. .................. 351/158; 385/88; 385/90
[58] Field of Search ........... 351/158, 205, 200, 233, 351/45, 204, 41, 221; 385/88, 92, 93, 89, 90

[56] References Cited

U.S. PATENT DOCUMENTS

| | | | |
|---|---|---|---|
| 3,060,308 | 10/1962 | Fortuna . | |
| 3,410,638 | 11/1968 | Langworthy . | |
| 3,745,993 | 7/1973 | Feinbloom | 128/23 |
| 3,912,918 | 10/1975 | Feinbloom | 240/1.4 |
| 3,947,139 | 3/1976 | Feinbloom | 403/90 |
| 4,086,004 | 4/1978 | Scrivo et al. | 351/158 |
| 4,204,743 | 5/1980 | Etaix | 385/88 |
| 4,232,934 | 11/1980 | Feinbloom | 385/88 |
| 4,274,128 | 6/1981 | Malis | 362/105 |
| 4,364,645 | 12/1982 | Feinbloom | 351/204 |
| 4,397,523 | 8/1983 | Feinbloom | 385/88 |
| 4,427,284 | 1/1984 | Dannatt | 355/1 |
| 4,498,743 | 2/1985 | Feinbloom | 351/45 |
| 4,555,164 | 11/1985 | Feinbloom | 359/670 |
| 4,621,283 | 11/1986 | Feinbloom | 358/93 |
| 4,649,434 | 3/1987 | Weinblatt | 358/250 |
| 4,799,793 | 1/1989 | Feinbloom | 356/127 |
| 4,802,756 | 2/1989 | Feinbloom | 351/200 |
| 4,807,985 | 2/1989 | Feinbloom | 351/158 |
| 4,807,987 | 2/1989 | Bastable et al. | 351/205 |
| 4,859,032 | 8/1989 | Feinbloom | 359/802 |
| 4,863,468 | 9/1989 | Feinbloom et al. | 623/6 |
| 4,946,257 | 8/1990 | Feinbloom et al. | 359/399 |
| 4,988,185 | 1/1991 | Feinbloom | 351/233 |
| 5,087,112 | 2/1992 | Feinbloom | 359/800 |
| 5,090,796 | 2/1992 | Feinbloom | 351/158 |
| 5,095,517 | 3/1992 | Monguzzi et al. | 385/90 |
| 5,129,717 | 7/1992 | Feinbloom | 351/158 |

Primary Examiner—Loha Ben
Attorney, Agent, or Firm—Weingarten, Schurgin, Gagnebin & Hayes

[57] ABSTRACT

An illumination assembly includes a lens housing having a first end and a second end, a first lens having first and second opposing surfaces with the first lens being disposed in a first end of the lens housing. A cane having a first a second surfaces is disposed in the lens housing with the first surface of the cane being spaced a predetermined distance from a first surface of the lens and wherein the second surface of the cane is polished and disposed against a first polished surface of a fiber optic bundle.

15 Claims, 4 Drawing Sheets

ILLUMINATION ASSEMBLY

BACKGROUND OF THE INVENTION

This invention relates generally to illumination systems and more particularly to telescopic spectacle illumination systems.

As is known in the art, telescopic spectacles are used by surgeons and others who must work with minute objects. Typically the telescopes are arranged either in pairs, with one telescope positioned for viewing by each eye of the wearer, or alternatively, with a single telescope positioned in the center of the spectacles. The image path from the single telescope is divided into two images, with one image being viewed by each eye. Telescopic spectacles may be constructed either with or without an integral object illuminator.

When the illumination, either supplied by a light source which is integral with the telescopic spectacles or otherwise provided externally, does not illuminate the object to be viewed along the viewing image path, portions of the object in the light path cast shadows. The casting of shadows increases the difficulty in viewing other portions of small objects, for example within an operating field. Shadows are least when the illumination beam and the viewing image are substantially aligned along the same optical path. Conversely shadows increase in size as the angle of divergence between the illumination beam and the viewing image path increases.

SUMMARY OF THE INVENTION

In accordance with the present invention, an illumination assembly includes a lens housing having a first end and a second end, a first lens having first and second opposing surfaces with the first lens being disposed in a first end of the lens housing. The illumination assembly further includes a cane having a first surface and a second surface with the cane being disposed in the lens housing with the first surface of the cane being spaced a predetermined distance from the first surface of the lens and wherein the second surface of the cane is provided having a polished surface. A fiber optic bundle having a first end and a second end is disposed in the lens housing with the first end of the fiber optic bundle having a polished surface and disposed adjacent the second surface of the cane. With this particular arrangement, an illumination assembly which may be disposed on a spectacle frame, for example, is provided. A second lens having first and second opposing surfaces may be disposed in the lens housing with the first surface of the second lens adjacent the second surface of the first lens and the second surface of the second lens adjacent an aperture of the lens housing. The first lens may be provided as a singlet and the second lens may be provided as a doublet to thus direct and focus light fed from a light source through the fiber optic bundle to the cane and lenses. By providing the fiber optic bundle having a flat polished surface, the diameter of the outermost surface area of the polished surface is maximized. Furthermore, by providing the second surface of the cane and the first surface of the fiber optic bundle having flat polished surfaces the two surfaces may be disposed such that maximum contact occurs between the two surfaces. The cane, singlet lens and doublet lens provide a focusing system which provides the illumination system having a convergent beam.

BRIEF DESCRIPTION OF THE DRAWINGS

The foregoing features of this invention as well as the invention itself may be more fully understood from the following detailed description of the drawings in which.

DESCRIPTION OF THE PREFERRED EMBODIMENTS

Figure 1:
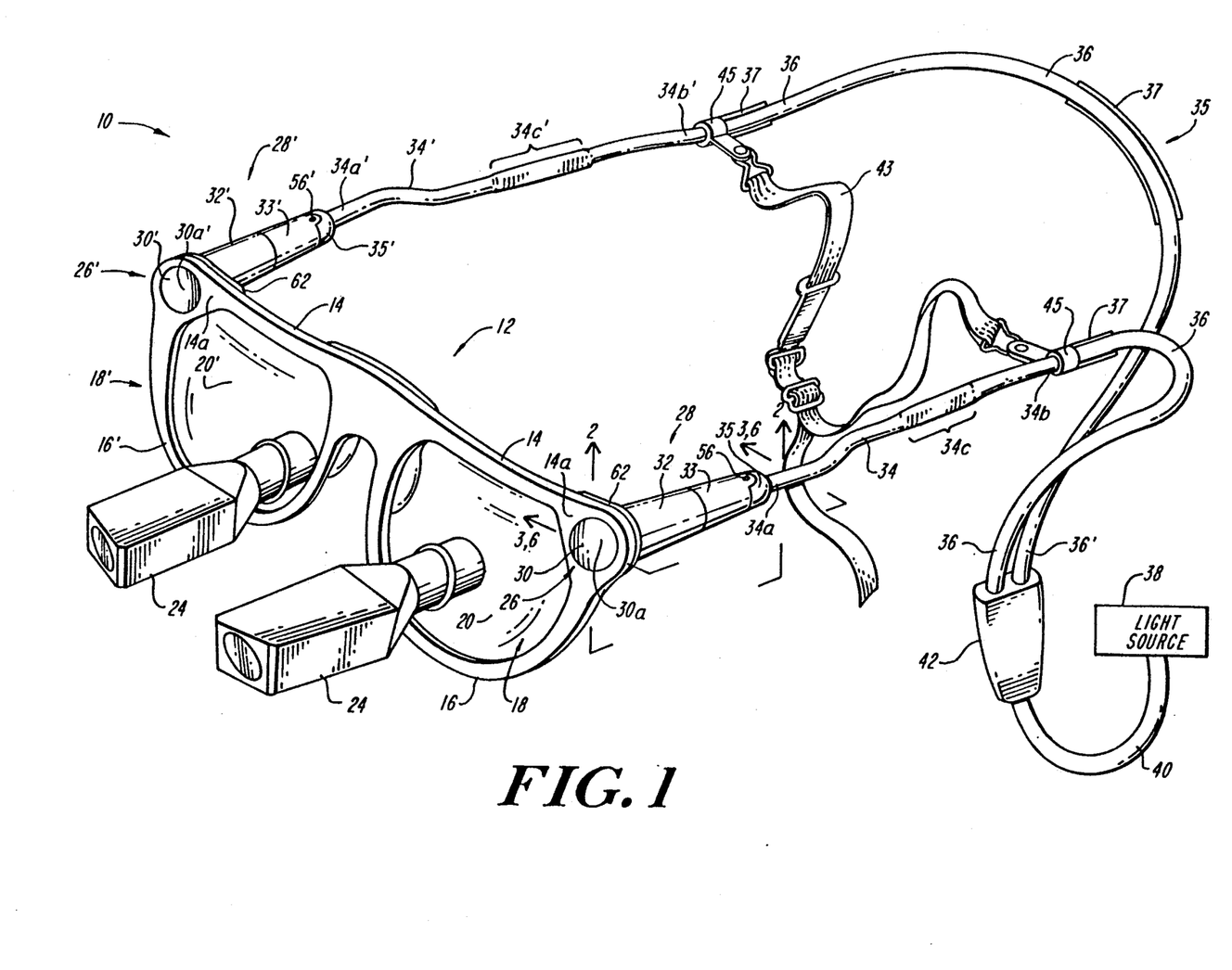
FIG. 1 is a perspective view of a pair of telescopic spectacles having an integral illumination assembly.

Referring now to FIG. 1, a pair of telescopic spectacles 10 includes a frame 12 having a top frame portion 14 and a pair of rim portions 16, 16'. The rim portions 16, 16' are respectively attached to left and right sides of the top frame portion 14 to provide the frame having first and second apertures 18, 18'. Each aperture 18, 18' has disposed therein a lens 20, 20'.

Each of the lenses 20, 20' may be provided having a hole (not numbered) therethrough in which a telescope 24 may be disposed. Each of the telescopes 24 may be provided and disposed in the holes in a manner described in co-pending patent application Ser. No. 07/923,081 filed on Jul. 31, 1992 having named inventors Frederick Morris and Bernard Clark and assigned to the assignee of the present invention and incorporated herein by reference. Alternatively, in some applications it may be preferable to omit the telescopes 24, 24' in which case the lenses 20, 20' would not have holes therein. It should also be noted that lenses 20, 20' may be provided as prescriptive lenses or merely protective lenses.

The top frame portion 14 is provided having a bore 26, 26' through right and left ends thereof. An illumination assembly 28, is disposed through the bore 26. A like illumination assembly 28' is disposed through the bore 26'.

Taking illumination assembly 28 as representative of illumination assembly 28' the illumination assembly 28 includes a lens housing 32, a first lens 30 disposed in a first aperture of the lens housing 32, a spring housing 33, and an adapter housing 35 pivotally coupled to the spring housing 33 by a top adapter pin 56 and a bottom adapter pin (not shown). The illumination assembly 28 is coupled to the frame 12 such that the lens 30 is disposed through the bore 26 and a first surface of the lens 30a is exposed through the bore 26 and slightly protrudes from a front surface 14a of the top frame portion 14. The illumination assembly 28 will be further described in conjunction with FIG. 2, suffice it here to say however that the first lens 30 of the illumination assembly 28 is disposed such that light is directed to a predetermined viewing area.

A frame temple 34 here provided as a hollow tube, has a first end 34a coupled to the illumination assembly 28 and a second end 34b. The frame temple 34 is here shown in the open position, however, as will be described further in conjunction with FIGS. 6A-6C, the adapter housing 35 may pivot about the adapter pivot pins 56 to such that the frame temple 34 may alternatively be placed in a closed position.

An illumination cable includes a potted fiber bundle 36 having a first numerical aperture. The fiber bundle 36 may be covered by a silicon cover 37 as is generally known. Here, portions of the silicon cover have been removed to expose the fiber bundle 36. A first end of the fiber bundle 36 is disposed through the hollow region of the frame temple 34 and coupled to the illumination assembly 28 in a manner to be described herein below in conjunction with FIG. 2. A second end of the glass fiber 36 is coupled to a first port of a bifurcated junction box 42. The glass fibers 36, 36' are provided by splitting a first fiber optic bundle 40, here said fiber optic bundle having a diameter typically of about 5 millimeters. Here the fiber optic bundle 40 is split into a pair of glass fibers 36, 36' each having a diameter typically of about 3.5 millimeters. The glass fibers 36, 36' are here separated and disposed in separate ports of the bifurcated junction box 42. The junction box 42 maintains the separation between each of the glass fibers 36, 36'. Each of the fibers 36 is subsequently coupled to a respective one of the illumination assemblies 28, 28'. The unsplit portion of the fiber optic bundle 40 is coupled to a light source 38. Thus, a first end of the fiber 36 is coupled to the illumination assembly 28 and a second end of the fiber 36 is coupled to the light source 38.

Each end of a headband 43 is coupled to one of the frame temples 34 by a headband mounting strap 45. The headband 43 is disposed to securely hold the telescopic spectacles 10 to the head of a user (not shown). At the interface between the fiber optic bundle 36 and the frame temple 34 the silicon cover 37 ends and is bonded to the second end of the temple 34b. The headband mounting strap 45 is disposed about this bonded region to prevent the cover 37 from being peeled back and exposing the fiber optic cable 36.

Figure 2:
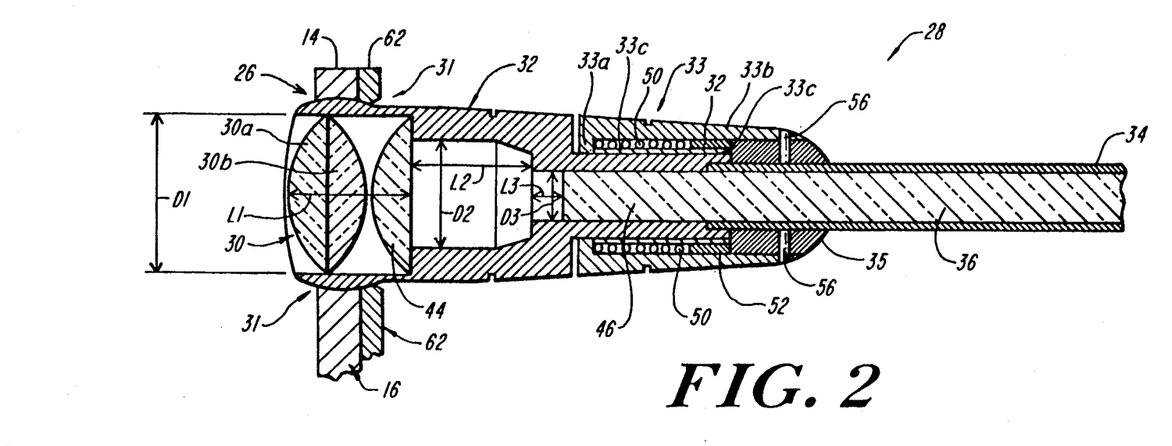
FIG. 2 is a cross-sectional view along the lines 2—2 of FIG. 1.

Referring now to FIG. 2 in which like elements of the illumination assembly 28 of FIG. 1 are provided having like designations, the illumination assembly 28 includes the lens housing 32 in which the first lens 30 is disposed. The lens housing is provided having a first cavity region having a length L1 typically of about 0.337 inch and an internal diameter D1 typically of about 0.473 inch The lens 30 is disposed in the first cavity region and is here shown to be provided from first and second convex lenses 30a and 30b which are bonded together to provide the lens 30 as a doublet. A third convex lens 44, here provided as a singlet, is also disposed in the first cavity region with a first surface of the third lens 44 in contact with a first surface of the lens 30b. A second surface of the third lens is disposed in contact with a first internal surface of the lens housing 32. The doublet 30 and singlet 44 are each fixed to the lens housing 32 via an epoxy. The lens housing also has a second cavity region having a length L2 typically of about 0.329 inch and a diameter D2 typically of about 0.312 inch. The lens housing further includes a third cavity region having a length L3 typically of about 0.087 inch and a diameter D3 typically of about 0.135 inch. A cane 46 having a diameter typically of about 0.140 inch and a length typically of about 0.250 inch may be disposed in a fourth cavity region of the lens housing 32.

The cane 46 is provided as a single fiber optical cane having a numerical aperture corresponding to the numerical aperture as the fiber bundle 36. Single fiber optical canes such as cane 46 are commercially available as is well known to those of skill in the art. Here a first end of the cane 46 is provided having a flat polish. A first surface of the fiber bundle 36 is provided having a like polish to thus provide a flush interface between the first surface of the cane 46 and the first surface of the fiber 36. The cane 46 acts as a homogenizer to properly couple the light from the glass fiber 36 to the singlet 44.

The spring housing 33 is provided as a sleeve having a base region 33a having a bore therethrough and a pair of sleeve walls disposed on inner and outer diameters of the base region 33a with a cavity region between the two sleeve walls 33b, 33c. The spring housing 33 is disposed about a first end of the lens housing 32.

Figure 3:
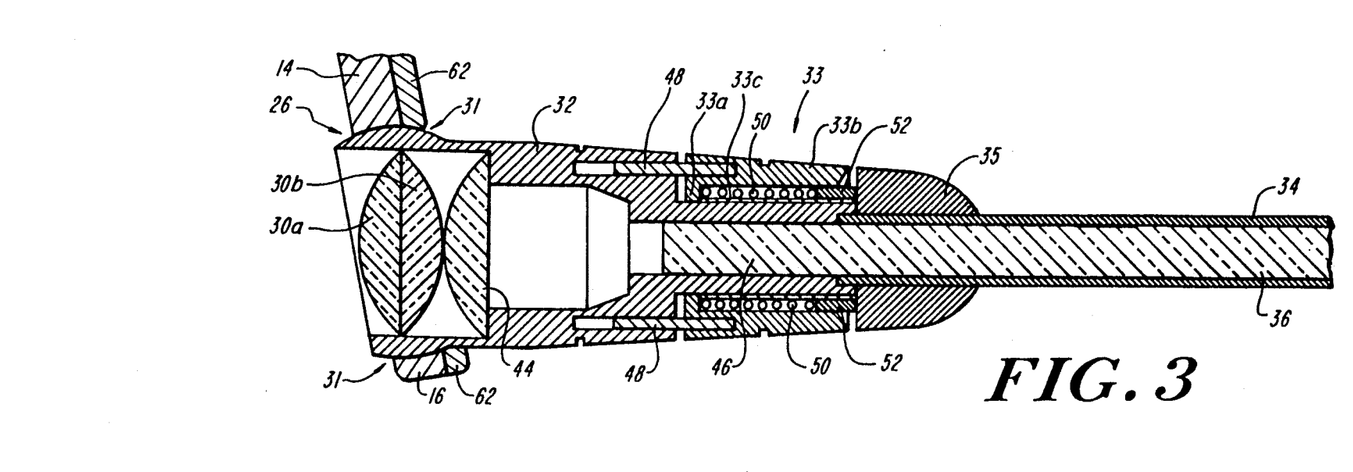
FIG. 3 is a cross-sectional view along the lines 3—3 of FIG. 1.

Referring briefly to FIG. 3 in which like elements of the illumination assembly 28 of FIGS. 1 and 2 are provided having like designations, a pair of pins 48 disposed in the lens housing 33 align with a corresponding pair of holes in the lens housing to connect the lens housing 32 to the spring housing 33. The pins 48 prevent the spring housing 33 from rotating with respect to the lens housing 32.

Returning now to FIG. 2, a spring 50 is disposed in the cavity region and a locking ring 52 is disposed over an open portion of the cavity opposite said base region 33a to retain the spring in the cavity. The adapter housing 35 is disposed over the second end of the lens housing 32 to fasten the fiber optic bundle 36 in the lens housing 32.

A pair of adapter pins 56 pivotally connect the adapter 35 to the spring housing 33 such that the adapter 35 may pivot with respect to the spring housing 33. This allows the temples 34 to be placed in open and closed positions as will be described further in conjunction with FIG. 6.

The temple 34 is here provided as a hollow tube having an outside diameter typically of about 0.188 inch and diameter typically of about 0.150 inch. The fiber 36 having an outside diameter typically of about 0.138 inch is disposed through the hollow center of the frame temple 34.

Here the lenses 30 and 44 are provided as 12 mm lenses. However, in some applications it may be desirable to reduce the size of the lenses to gain the advantage of a concomitant reduction in the size of the illumination assembly 28. For example, the lenses 30, 44 may be provided as 8 mm lenses and the corresponding dimensions of the lens housing 32, cane 46, spring housing 33, adapter 35 and fiber bundle 36 may be adjusted accordingly.

Figure 4:
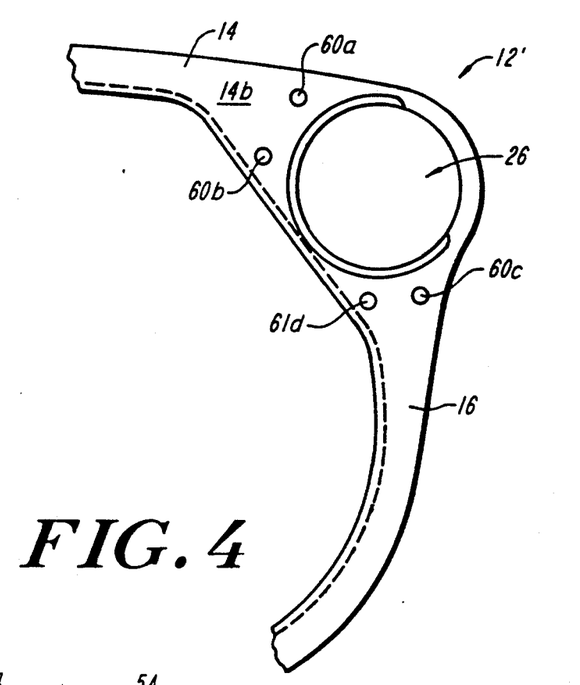
FIG. 4 is a rear view of a portion of the frames shown in FIG. 1.

Referring now to FIG. 4 a portion 12' of the frame 12 (FIG. 1) including the top frame portion 14 and the rim portion 16 is shown having four threaded holes 60a–60d provided in a rear surface 14b thereof. The bore 26 of the top frame portion 14 (FIG. 1) is here shown to have a shape corresponding to a spherical pocket 26 which mates to the first end of the lens housing 32 (FIGS. 1, 2, 3). That is, a first region 31 (FIG. 3) of the lens housing 32 (FIGS. 1, 2, 3) is provided having an outer radius which corresponds to the inner radius of the spherically shaped bore 26. Here the outer radius of the region 31 (FIGS. 1, 2, 3) is typically of about 0.285 inch. Thus, the first region of the lens housing 31 (FIGS. 1, 2, 3) and the spherically shaped bore 26 fit together similar to a ball and socket arrangement wherein the lens housing 32 (FIGS. 1, 2, 3) acts as the ball and the bore 26 acts as the socket.

Figure 5:
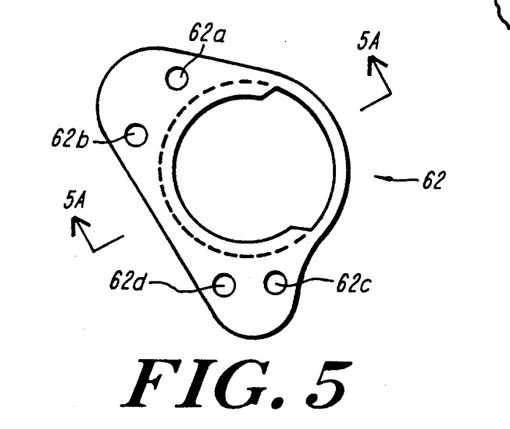
FIG. 5 is a top view of a locking ring.
Figure 5A:
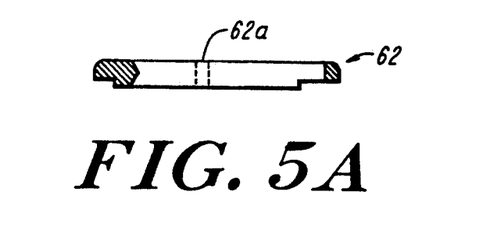
FIG. 5A is a cross sectional view of the locking ring taken along the lines 5A—5A of FIG. 5.

Referring briefly to FIGS. 5 and 5A, a lens housing clamp 62 having four clearance holes 62a-62d disposed therethrough in a pattern corresponding to the pattern of the threaded holes 60a-60d (FIG. 4) is used to fasten the lens housing 32 to the frame 12 via screws (not shown) disposed through each of the clearance holes 62a-62d and threaded into the holes 60a-60d (FIG. 4). Before the screws are tightened the illumination assembly 28 (FIGS. 1, 2, 3) is moveable within the bore and may be directed at one of a range of angles. Thus, the illumination assembly 28 may be positioned to point at a particular working distance and declination angle. This step may be accomplished using the alignment apparatus described in co-pending patent application identified as having serial no. 07/923,081 filed on Jul. 31, 1992 having named inventors Frederick Morris and Bernard Clark and assigned to the assignee of the present invention. Other methods of course may also be used to aim the illumination assembly 28 (FIGS. 1, 2, 3) in a predetermined direction.

Referring again now to FIGS. 2 and 3, an ultra-violet (UV) bonding epoxy may be disposed on the lens housing 32 to temporarily fix the illumination assembly 28 in a predetermined position within the socket 26. Suffice it here to say that when the illumination assembly 28 is disposed in the desired location and pointing at the correct working distance and declination angles, the bonding epoxy is exposed to UV light and the illumination assembly 28 is thus permanently bonded in place and illuminates a viewing area corresponding to a predetermined working distance and declination angle.

The telescopic spectacle assembly 10 (FIG. 1) may then be disposed in a holding fixture, such as a vice (not shown) for example, and a final bonding material may be disposed on the illumination assembly 28 and cured to permanently hold the lens housing 32 in the socket 26 of the frame 12 at the declination and convergence angle corresponding to the user.

Steps to assemble the illumination assembly 28 will now be described. First it should be noted that the optics including the lenses 30, 44 and the cane 46 disposed in lens housing 32 may be assembled independently from the temple 34.

Thus with reference to the temple 34, the fibers 36 are fed through the temple 34 while the temple 34 is straight. The temple 34 is then cold formed in a forming die to a predetermined shape selected to fit a user. The bending of the temple 34 may be accomplished using commercially available tools as is generally known. A region 34c (FIG. 1) of the temple may optionally be flattened in an area which will rest above the user's ear. It should be noted however that the region 34c is flattened care should be taken to not destroy any of the fibers in the fiber bundle 36 disposed through the temple 34.

The portion of the fiber bundle 36 extending past the end of the temple 34a may then be polished using any technique well known to those of skill in the art to provide the first end of the fiber 36 having a flat surface.

Now with reference to the lens housing 32, the lenses 30, 44 and cane 46 are inserted and bonded into predetermined positions of the lens housing 32. Next the spring housing 33 is disposed over lens housing 32. The pins 48 (FIG. 3) on the spring housing 33 should mate with corresponding holes in the lens housing 32. Next the spring 50 is disposed in the spring housing cavity.

The locking ring 52 is then pressed onto the back of the lens housing 33 to hold the spring 50 in place. The lens housing 32 with the spring housing 33 attached thereto may then be inserted into the spherical socket 26 in the rear surface 14b of frame 12.

The clamp 62 is then place over the back of the lens housing 32 and screws (not shown) are inserted through the holes 62a-62d of the clamp 62 and into the frame 12 to secure the clamp 62 and thus the lens housing 32 to the frame 12. At this point the lens housing 32 should be positioned such that the front contour of the lens housing 32 substantially corresponds to the contour of the first surface of the frame 14a.

At this point the headband mounting strap 45 may be disposed over the temple 34 with the and the adapter 35 may be placed over the temple 34 and inserted into spring housing 33. The proper orientation of the temple 34 within the adapter 35 is then established and the temple 34 is fixed to the adapter 35 by bonding with epoxy or by using any other technique well known to those of skill in the art. The adapter 35 having the temple 34 bonded thereto, may now be connected to the spring housing 33 by pressing the adapter pins 56 into the corresponding mating holes located in the spring housing 33 and the adapter 35 to thus provide the assembled illumination assembly 28.

After aligning the lens housing 32 in a predetermined position, the lens housing 32 may be bonded to the frame 12 to hold the lens housing in the desired position. Next, the headband mounting strap 45 may be bonded to the silicon cover 37 and the headstrap 44 may then be attached.

Figure 6A:
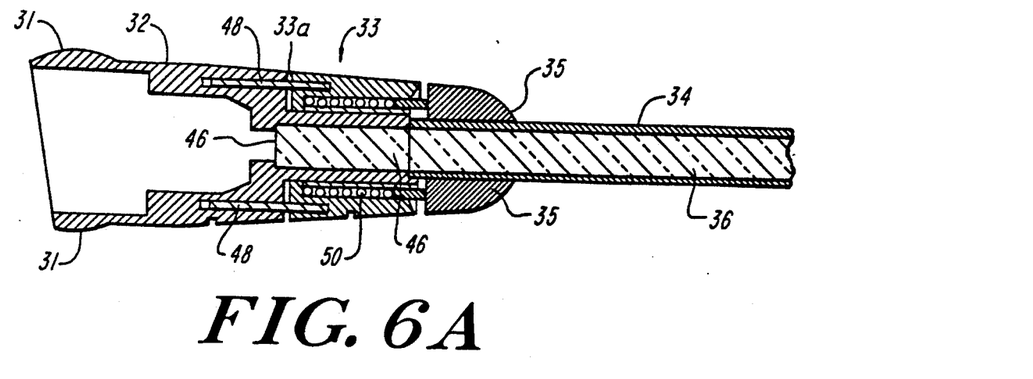
FIGS. 6A—6C are a series of cross-sectional views taken along the lines 6—6 of FIG. 1 showing the steps involved in closing a temple arm.
Figure 6B:
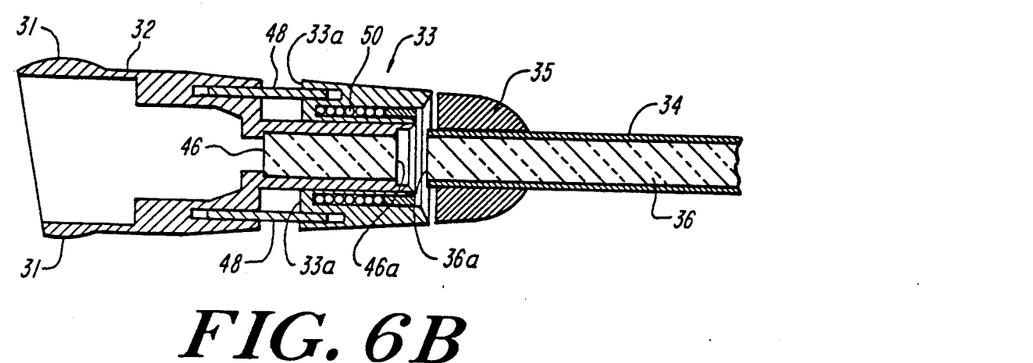
Figure 6C:
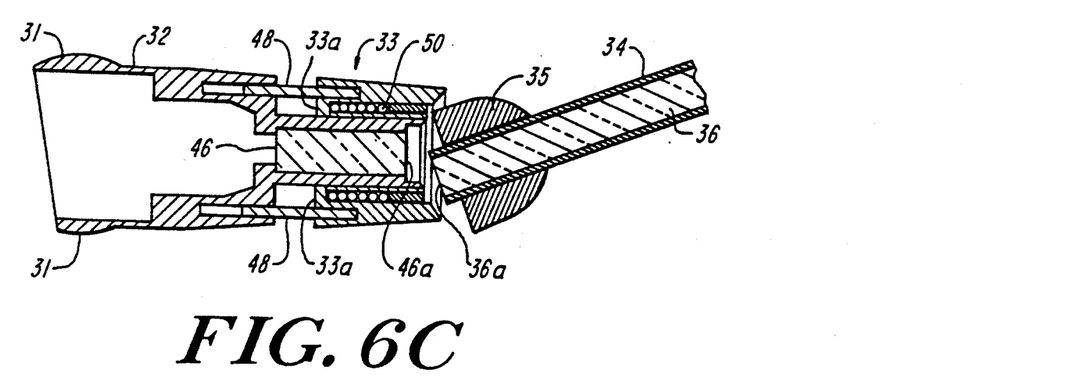

Referring now to FIGS. 6A-6C in which like elements of the illumination assembly 28 of FIGS. 2 and 3 are provided having like designations, steps in closing the temple arm 34 will now be described. It should first be noted however that for clarity of viewing the lenses 30 and 44 have been omitted. It should also be noted that adapter 35 and temple arm 34 pivot about the adapter pins 56 which are clearly shown in FIGS. 1 and 2 but which are nor present in this view.

FIG. 6A shows the temple 34 in the full open position and thus the fiber 36 is disposed against the surface of the cane 46. Preferably the surface of the fiber 36 contacts the surface of the cane 46 however a gap typically of about 0.002 inch between the two surfaces is also acceptable.

As shown in FIG. 6B, the fiber 36, temple 34, adapter 35 and spring housing 33 are separated from the cane 46 and lens housing 32 here a distance typically of about 0.125 inch. The base region 33a of the spring housing 33 compresses the spring 50, however the pins 48 maintain contact between the lens housing 32 and spring housing 33.

As shown in FIG. 6C, the adapter 35 and thus the temple 34 may now freely pivot about the adapter pivot pins 56 (FIG. 2). Thus the temple is free to swivel about the pins 56 (FIG. 2) to a fully closed position.

Having described preferred embodiments of the invention, it will now become apparent to one of skill in the art that other embodiments incorporating the concepts may be used. It is felt, therefore, that these embodiments should not be limited to disclosed embodiments but rather should be limited only by the spirit and scope of the appended claims.

What is claimed is:

1. An illumination assembly comprising:
a lens housing having a first end and a second end;

a first lens having first and second opposing surfaces said first lens being disposed in the first end of said lens housing;

a cane having a first surface and a second surface with said cane being disposed in said lens housing with the first surface of said cane being spaced a predetermined distance from a first surface of said first lens and wherein the second surface of said cane is polished; and a fiber optic bundle having a first end and a second end with the first end of said bundle being polished and disposed against the second surface of said cane.

2. The illumination assembly of Claim 1 further comprising:

a second lens having first and second opposing surfaces said second lens being disposed in the second end of said lens housing;

a spring housing having a base region with a bore therethrough and a pair of side walls disposed on first and second regions of said base region and spaced to provide a cavity region wherein said spring housing is disposed over a portion of said lens housing;

a spring disposed in the cavity region of said spring housing; and an adapter housing having a first end pivotally coupled to said spring housing and having a second end connected to said fiber optic bundle and wherein said adapter housing may be pivoted relative to said lens housing.

3. The illumination assembly of claim 2 wherein:
said first lens is a doublet;
said second lens is a singlet; and
said cane is provided as a single fiber.

4. The illumination assembly of claim 3 further comprising a light source coupled to the second end of said fiber optic bundle.

5. A telescopic spectacle comprising:

a spectacle frame having a top bar with a bore therein;

a housing having a first end with a first aperture therein and a second end with a second aperture therein, wherein the first end of said housing is disposed in the bore of said top bar; and a first lens disposed in the first aperture of said housing, wherein a beam of light travels from the second aperture of said toward the first aperture of said housing and said first lens directs the beam of light from the first aperture of said housing to a predetermined viewing area.

6. The telescopic spectacle of claim 5 further comprising:

a temple having a first end and a second end with the first end of said temple being coupled to the second end of said housing; and a fiber optic rod disposed in said temple.

7. The telescopic spectacle of claim 5 further comprising:

a bottom rim coupled to said top bar to provide the spectacle frame having an aperture;

a lens having a bore therein, said lens being disposed in the aperture formed by said top bar and bottom rim; and a telescope assembly disposed through the bore of the lens.

8. A telescopic spectacle comprising:

a spectacle frame having a top bar with a bore therein;

an illumination housing having a first end with a first aperture therein and a second end with a second aperture therein, wherein the first end of said illumination housing is disposed in the bore of said top bar and said illumination housing further comprises:

a cane having a first end and a second end, with the first end of said cane disposed in the second end of said illumination housing adjacent the second aperture;

a first lens having a first and second surface with the first surface of said first lens disposed a predetermined distance from the first end of said cane;

a second lens having a first and a second surface with the first surface of said second lens disposed adjacent the second surface of said first lens; and wherein said first lens and second lens are disposed to direct a beam of light fed from the second aperture toward the first aperture of said illumination housing and to a predetermined viewing area.

9. The telescopic spectacle of claim 8 further comprising:

a fiber optic rod coupled to the second aperture of said illumination housing, said fiber optic rod for carrying light from a light source to said illumination housing.

10. The telescopic spectacle of claim 9 further comprising:

a frame temple having a first end and a second end and having a bore therethrough, with the first end of said frame temple being connected to the fiber optic rod and the second end of the frame temple being connected to the second aperture of said illumination housing; and wherein said fiber optic rod is disposed in the bore of said frame temple and a first polished end of said fiber optic rod is disposed against a first surface of said cane.

11. The telescopic spectacle of claim 10 wherein:
said first lens is provided as a convex lens; and
said second lens is provided as a doublet lens comprising:

a first convex lens having a first surface and a second surface; and a second convex lens having a first surface and a second surface wherein the first surface of said first convex lens is bonded to the second surface of said second convex lens.

12. A telescopic spectacle comprising:

a spectacle frame having a top bar having a bore therein and a bottom rim coupled to said top bar to provide an aperture;

a lens disposed in the aperture of said frame, said lens having a bore therein;

a telescope assembly disposed through the bore of the lens;

an illumination assembly having a first end with a first aperture therein and a second end with a second aperture therein, wherein the first end of said illumination assembly is disposed in the bore of said top bar and said illumination assembly further comprises:

a cane having a first end and a second end, with the first end of said cane disposed in the second end of said illumination assembly adjacent said second aperture;

a first lens having a first surface and a second surface with the first surface of said first lens disposed adjacent the second end of said cane;

a second lens having a first surface and a second surface with the first surface of said second lens disposed adjacent the second surface of said first lens; and wherein said first lens and second lens are disposed to direct a beam of light from the cane to the first aperture of said illumination assembly and toward a predetermined viewing area.

13. The telescopic spectacle of claim 12 further comprising:

a fiber optic rod coupled to the second aperture of said illumination assembly, said fiber optic for carrying light from a light source to said illumination assembly.

14. The telescopic spectacle of claim 13 further comprising:

a frame temple having a first end and a second end and having a bore therethrough, with the first end of said frame temple being connected to the fiber optic rod and the second end of the frame temple being connected to the second aperture of said illumination assembly; and wherein at least a portion of said fiber optic rod is disposed in the bore of said frame temple. illumination assembly, said fiber optic rod for carrying light from light source to said illumination assembly.

15. The telescopic spectacle of claim 14 wherein said telescope assembly further comprises:

a first housing having a first aperture, a first region with a bore therein and a second region having a cavity therein, a second aperture and a first surface;

a lens retainer disposed in the first aperture of said first housing;

an eyepiece assembly disposed in the first region of said first housing said eyepiece assembly comprising:

(a) a lens housing having a first end with a first aperture and having a second opposing end with a second aperture (b) a first lens having a first surface and a second surface disposed in the first aperture of said lens housing; and (c) a second lens having a first surface and a second surface, disposed in the second aperture of said lens housing with the first surface of said second lens being disposed a predetermined distance from the second surface of said first lens;

a prism, having first and second opposing surfaces, disposed in the second region of said first housing with the first surface of said prism spaced a predetermined distance from said eyepiece assembly;

a second housing having a first surface, a first aperture, a first cavity region and a second region having a bore therein with the first surface of said second housing disposed against the first surface of said first housing; and a third lens disposed in the second region of said second housing with a first surface of said third lens spaced a predetermined distance from a first surface of said prism.

* * * * *

UNITED STATES PATENT AND TRADEMARK OFFICE
CERTIFICATE OF CORRECTION

PATENT NO. : 5,331,357
DATED : July 19, 1994
INVENTOR(S) : Denton A. Cooley, et al.

It is certified that error appears in the above-indentified patent and that said Letters Patent is hereby corrected as shown below:

Column 4, line 39, "and diameter" should read --and an inside diameter--.

Column 7, line 49, "of said toward" should read --of said housing toward--.

Column 9, lines 29-31, claim 14, "temple. illumination assembly, said fiber optic rod for carrying light from light source to said illumination assembly." should read --temple.-- , (everything after "temple." should be deleted).

Signed and Sealed this

Tenth Day of January, 1995

Attest:

BRUCE LEHMAN

Attesting Officer   Commissioner of Patents and Trademarks